United States Patent
Banga et al.

(10) Patent No.: US 8,327,174 B2
(45) Date of Patent: Dec. 4, 2012

(54) LOADING OPERATING SYSTEMS USING MEMORY SEGMENTATION AND ACPI BASED CONTEXT SWITCH

(75) Inventors: Gaurav Banga, Cupertino, CA (US); Kaushik Barde, Sunnyvale, CA (US); Ajay Kamalvanshi, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 557 days.

(21) Appl. No.: 12/459,953

(22) Filed: Jul. 10, 2009

(65) Prior Publication Data

US 2010/0241839 A1    Sep. 23, 2010

Related U.S. Application Data

(60) Provisional application No. 61/210,578, filed on Mar. 20, 2009.

(51) Int. Cl.
   *G06F 1/00* (2006.01)
   *G06F 1/32* (2006.01)
(52) U.S. Cl. ......... 713/323; 713/300; 713/320; 719/312
(58) Field of Classification Search .............. 713/300, 713/320, 323; 719/312
   See application file for complete search history.

(56) References Cited

U.S. PATENT DOCUMENTS

| | | |
|---|---|---|
| 2005/0235123 A1 | 10/2005 | Zimmer |
| 2007/0005947 A1 | 1/2007 | Chartrand |
| 2007/0055860 A1 | 3/2007 | Wang |
| 2008/0092145 A1* | 4/2008 | Sun et al. ............... 719/312 |
| 2008/0189538 A1 | 8/2008 | King |
| 2010/0241821 A1 | 9/2010 | Barde |

FOREIGN PATENT DOCUMENTS

| | | |
|---|---|---|
| EP | 1037133 | 9/2000 |
| GB | 2418751 | 5/2006 |
| WO | 2006088637 | 8/2006 |
| WO | WO2007/109145 | 9/2007 |

OTHER PUBLICATIONS

International Searching Authority, International Search Report and Written Opinion dated Jul. 21, 2010, pp. 14.
"Dynamic Resource Management for Hibernation Swapping of PREHibernated OS Image", IBM, IP.com journal, Sep. 29, 2003, pp. 2.
U.S. Appl. No. 12/459,963, Non-Final Rejection dated Nov. 14, 2011, pp. 1-7 and attachments.
U.S. Appl. No. 12/459,963, Final Rejection dated May 17, 2012, pp. 1-11 and attachments.

* cited by examiner

*Primary Examiner* — Paul Yanchus, III
*Assistant Examiner* — Michael J Brown

(57) ABSTRACT

Methods, systems, apparatuses and program products are disclosed for managing multiple OSes within a single computer and the like.
Provision is made for swapping OSes with BIOS assistance and conforming with ACPI features for System State management especially as related to ACPI system sleep State S3.

17 Claims, 5 Drawing Sheets

LOADING OPERATING SYSTEMS USING MEMORY SEGMENTATION AND ACPI BASED CONTEXT SWITCH

RELATED APPLICATION

This application claims the benefit of U.S. Provisional Application Ser. No. 61/210,578, filed on Mar. 20, 2009.

FIELD OF THE INVENTION

The present invention generally relates to personal computers and devices sharing similar architectures and, more particularly relates to a system and corresponding method for managing, activating and controlling plural operating system environments and/or the like within a computing apparatus or within a single computer operational session or context.

BACKGROUND OF THE INVENTION

Modernly, the use of PCs (personal computers), including so-called laptop and notebook computers, is increasingly common and the computers themselves are of increasing computer powerful, decreasing thermal power and ever more complex.

A vast majority of PCs have a controlling software, for example an OS (Operating System) such as Microsoft® Windows® Vista® or a like commercial product. Many varieties of OS are available largely due to the need to make design tradeoffs. In particular, feature richness with attendant complexity and size is traded off against (relatively) limited capabilities with increased speed (especially speed of operation and of load time).

Thus a need has existed to provide for the use of multiple OS within a computer and various approaches, each with its own tradeoffs, have been used.

One approach, so-called "dual-boot" involves selecting and loading the desired OS from a relatively cold state, this has a disadvantage of slowness but advantages that resources are devoted, rather than shared or partitioned.

Other approaches can involve virtualization, these have an advantage of providing for rapid switches between OS environments but there is a disadvantage in that the most complex and popular OS softwares available are not designed to work well in virtualized environments and further tradeoffs and impacts result. Moreover virtualization may require hardware features addressed thereto and hence be of relatively less universal application. And unfortunately the vendors of complex OS software have little incentive to make their products work well in peaceful coexistence with simpler OS products through virtualization.

Simpler OS products have advantages beyond speed, for example where such OS is "Open Source" the source code is smaller and hence more comprehensible. Moreover less complex software tends to be less vulnerable to malware attack.

There are further alternatives to dual-boot and virtualization (with different again tradeoffs) and the present invention is related to such.

SUMMARY OF THE INVENTION

The disclosed invention includes, among other things, methods and techniques for providing OS steering (control) assistance in pursuit of the support of multiple OSes (Operating Systems).

The present invention provides a method for operating a computer for data communications and also an apparatus that embodies the method. In addition program products and other means for exploiting the invention are presented.

According to an aspect of the present invention an embodiment of the invention may provide for loading a first and second OS (operating system) into separate partitions of a system memory; executing an instruction request for a change of ACPI (Advanced Configuration and Power Interface) System State; restoring a saved hardware state of the computer and transferring control between OSes.

An advantage and/or feature provided by or resulting from implementing the present invention is that control may be passed between multiple OSes (typically two OSes but optionally three or more) without need for either a lengthy reboot time or the disadvantages inherent in the use of virtualization techniques. Consequently there is an appearance of "instant" switch between OSes. Or at least a switching that is materially faster than previously developed implementations provided. Moreover, by incorporating the invention into a warm boot sequence an instant-on service can be provided or approached.

BRIEF DESCRIPTION OF THE DRAWINGS

The aforementioned and related advantages and features of the present invention will become better understood and appreciated upon review of the following detailed description of the invention, taken in conjunction with the following drawings, which are incorporated in and constitute a part of the specification, illustrate an embodiment of the invention and wherein like numerals represent like elements, and in which.

DETAILED DESCRIPTION OF THE INVENTION

Figure 1:
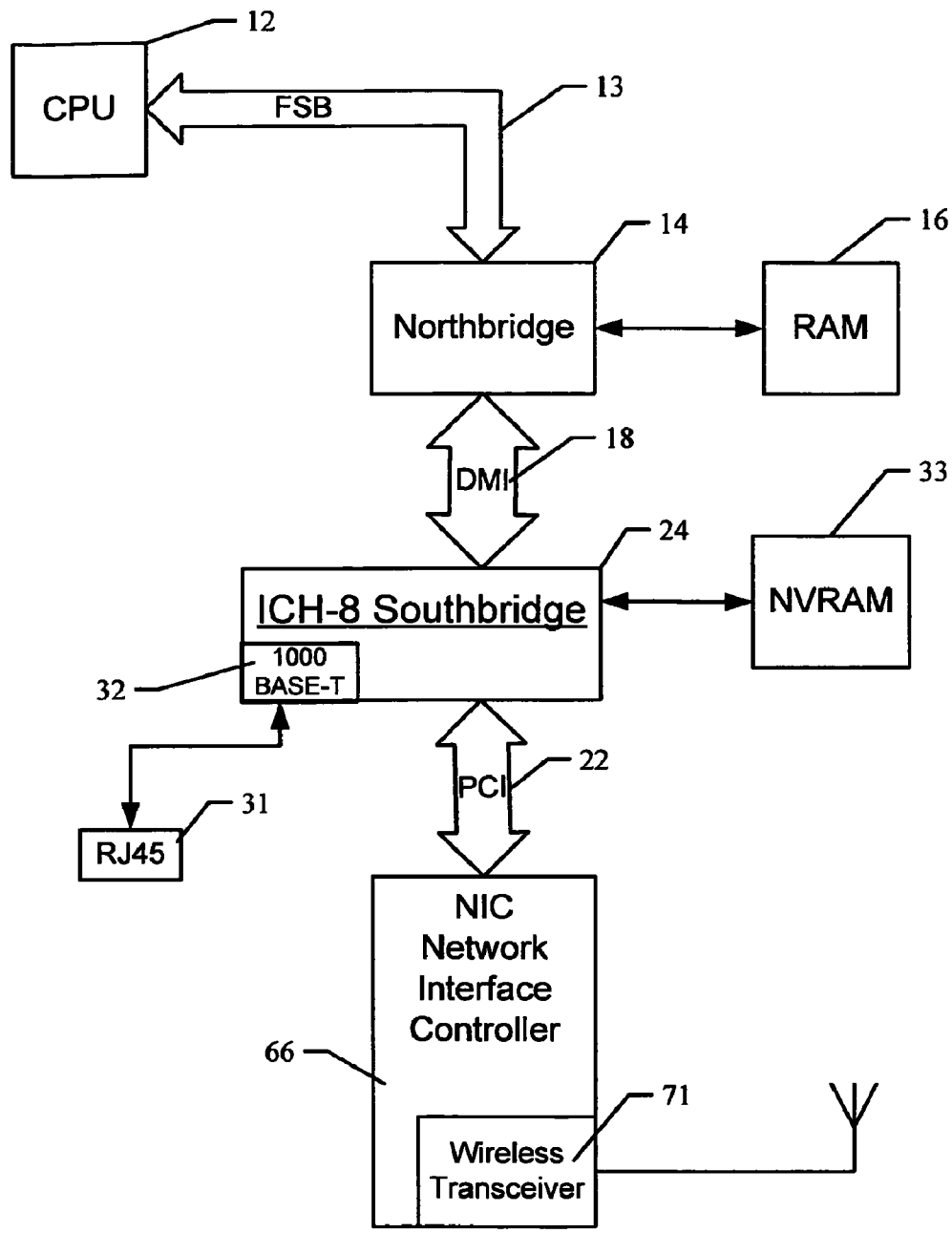
FIG. 1 is a schematic block diagram of an electronic device configured to implement the security functionality according to the present invention.

The numerous components shown in the drawings are presented to provide a person of ordinary skill in the art a thorough, enabling disclosure of the present invention. The description of well known components is not included within this description so as not to obscure the disclosure or take away or otherwise reduce the novelty of the present invention and the main benefits provided thereby.

An exemplary embodiment of the present invention will now be described with reference to the figures. FIG. 1 is a schematic block diagram of an electronic device configured to implement the security functionality according to the present invention.

In an exemplary embodiment, the electronic device 10 may be implemented as a personal computer, for example, a desktop computer, a laptop computer, a tablet PC or other suitable computing device. Although the description outlines the operation of a personal computer, it will be appreciated by those of ordinary skill in the art, that the electronic device 10 may be implemented as a PDA, wireless communication device, for example, a cellular telephone, embedded controllers or devices, for example, set top boxes, printing devices or other suitable devices or combination thereof and suitable for operating or interoperating with the invention.

The electronic device 10 may include at least one processor or CPU (Central Processing Unit) 12, configured to control the overall operation of the electronic device 10. Similar controllers or MPUs (Microprocessor Units) are commonplace. The processor 12 may typically be coupled to a bus controller 14 such as a Northbridge chip by way of a bus 13 such as a FSB (Front-Side Bus). The bus controller 14 may typically provide an interface for read-write system memory 16 such as RAM (random access memory).

In ordinary operation, CPU 12 may fetch computer instructions (also termed computer instruction codes, not shown in FIG. 1) from system memory 16. The CPU may then interpret the fetched computer instructions and operate to interpret the instructions thereby to control operation of the electronic device 10. Such use of CPU, system memory and computer instructions that typically comprise OS (Operating System) codes and other software are well known in the computing arts.

The bus controller 14 may also be coupled to a system bus 18, for example a DMI (Direct Media Interface) in typical Intel® style embodiments. Coupled to the DMI 18 may be a so-called Southbridge chip such as an Intel® ICH8 (Input/Output Controller Hub type 8) chip 24

The Southbridge chip 24, may typically incorporate a first NIC (Network Interface Controller) 32 such as of the 1000 BASE-T type of IEEE 802.3 (Institute of Electrical and Electronics Engineers standard number 802.3) interface connecting to an 8PC8 31 (8 positions, 8 contacts) type of wired network connector. An 8PC8 connector 31 is, colloquially known as an RJ45 port and IEEE 802.3 is colloquially known as Ethernet.

In a typical embodiment, the Southbridge chip 24 may be connected to a PCI (peripheral component interconnect) bus 22 which may in turn be connected to a second NIC 66 which drives a Wireless Transceiver 71. Wireless Transceiver 71 may operate in compliance with IEEE 802.11 or other suitable standards. Wireless Transceiver 71 will typically be coupled to some form of radio antenna 72. Also, typically, Southbridge chip 24 may also be coupled to a NVRAM (non-volatile random-access memory) 33.

Either or both NICs 32 and 66 may convey communications signals that are used to form logical network connections such as to an Internet Service. Indeed a typical computer or similar electronic device 10 may have other interfaces, for example USB (Universal Serial Bus, not shown in FIG. 1) that may in turn connect to (for example) a Bluetooth® transceiver for other modes of communication within the general scope of the invention.

Figure 2:
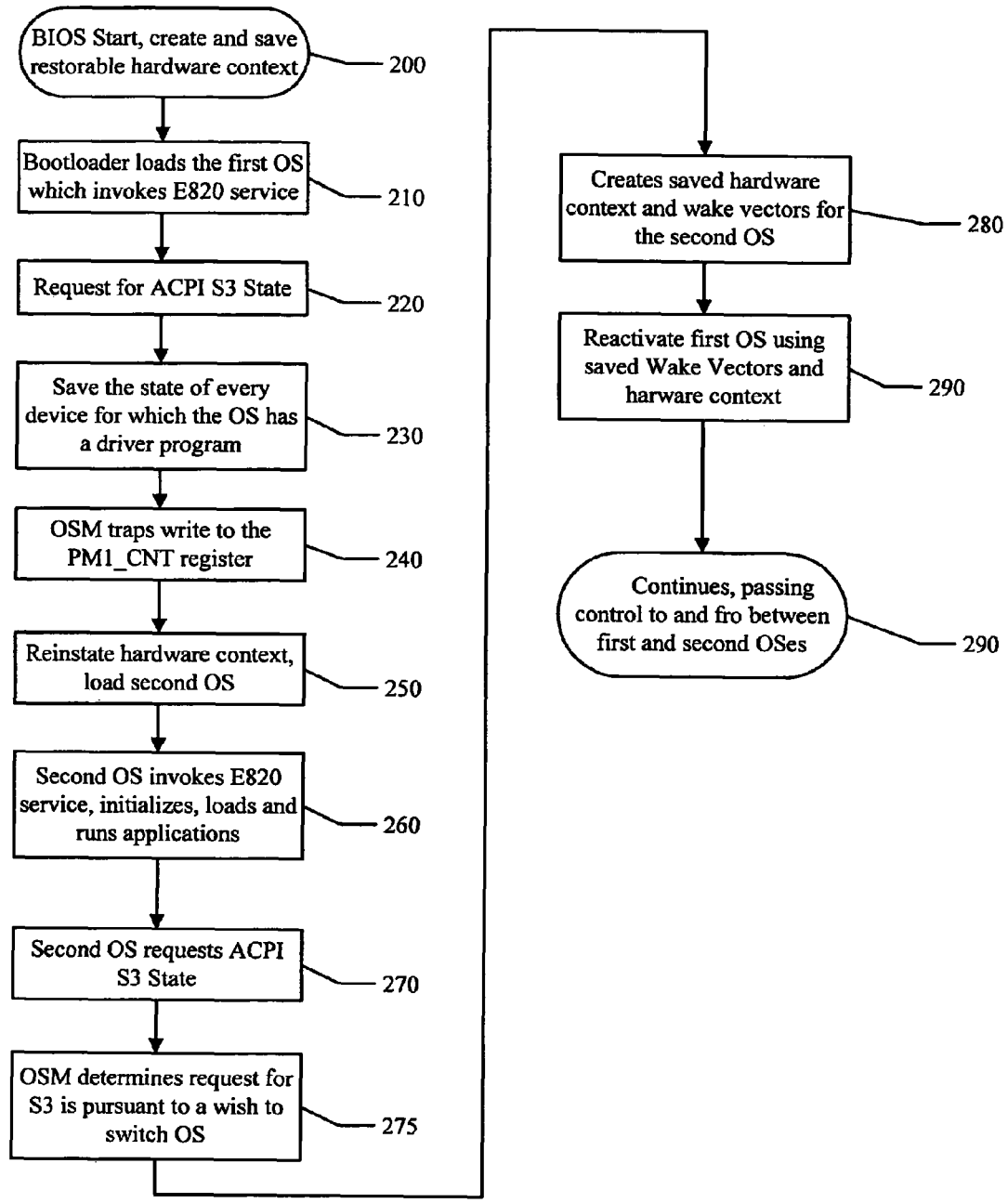
FIG. 2 is a flowchart illustrating an overview of some of the steps performed in implementing an embodiment of the present invention.

FIG. 2 is a flowchart illustrating an overview of some of the steps performed in implementing an embodiment of the invention. The approach described in FIG. 2 is a simplification and serves as a useful overview of a superficial understanding of how a simple embodiment of an important part of the invention may operate.

At step 200, execution of the pertinent part of BIOS instruction codes starts. As part of this step, BIOS defines the areas of memory that are usable by an OS and those areas that are reserved for BIOS use (for example, EBDA (extended BIOS data area), ACPI NVS (non-volatile storage) or SMRAM (System Management Mode RAM)). Alternatively some memory areas may be used by non-BIOS but nonetheless hardware directed services, for example shared video memory. BIOS then invokes OSM (OS Steering Module) which initializes memory including creating tables, saving base memory, saving ACPI NVS, PIC (programmable interrupt controller) values, hooks into E820 services to provide for custom maps and the like. E820 services are well-known in the art. In an embodiment of the invention, OSM is derived from the well-known GRUB (Grand Unified Bootloader program) and incorporates a bootloader section. Thus, inter alia, a restorable hardware context is saved.

At step 210, the bootloader section of OSM loads the first OS (operating system). OS calls E820 services to determine which areas of physical main memory it can use and loads into that memory. The BIOS service is aware of which OS is requesting E820 services (for example based on the memory address of the caller, or on which OS was most recently loaded though use of those criteria are merely examples) and presents a customized memory map responsive thereto.

Typically the First OS is loaded into a restricted (relatively small) memory partition and then runs application programs. At step 220 a start is made on a procedure leading to entering a save state, by using the request for ACPI S3 State (or save-to-RAM services or something similar) included in each OS.

At step 230, the OS saves the state of every device for which the OS has a driver program, for example the saving may be into a memory buffer. The OS may also flush pending data, typically out to disk The exemplary OS writes a specific value to an ACPI controlled register PM1_CNT thereby indicating that the OS and platform context is requested to imminently transition to ACPI System State S3. ACPI System States are well-known in the art.

The write to the PM1_CNT register described above may be trapped by the OSM (at step 240) which, having acquired control of the platform execution, then makes a determination that the request is for a context switch (as contrasted with a platform sleep state). In an embodiment of the invention, the determination is made responsive to a control bit in OSM data tables. Previously developed techniques are typically sufficient to cater for specifically multi-processor aspects of platform integrity. Wake vectors are stored in the manner customary for entering ACPI State S3.

At this point the behavior of OSM diverges greatly from the similar (up to now) action involves in entering ACPI State S3. For, having taken many of the same actions that precede entering ACPI State S3, the OSM proceeds instead to create and save a further restorable hardware context and set of wake vectors and in preparation for loading a second OS as described below. The process of creating a restorable hardware context and set of wake vectors is similar to that described in step 200, above.

At step 250, the hardware context that was saved in step 200 is reinstated. This brings the platform substantially back to its initial hardware state in preparation for loading a second OS. However the main memory map is not recreated, rather OSM ensures that when E820 services are next invoked it will be known by BIOS that the second OS is active. The second OS is then loaded and entered.

At Step 260, the second OS, as part of its normal initialization, invokes BIOS service E820 which is aware of which OS is requesting E820 services. The E820 memory map returned excludes the restricted memory partition that was set aside for the first OS and may typically include the residue of available physical RAM. The Second OS then completes its own initialization and runs application programs.

At step 270, responsive to a stimulus that makes desirable a return to a context of the first OS (and applications running under it) becoming active, the second OS invokes an ACPI function "change state to S3" function, such as by writing again to the PM1_CNT ACPI register. It may be noted that the second OS may request entry State S3 either responsive to a request to switch to the first OS (such as by a custom key combination). Or the second OS may choose to request imminent entry of S3 mode for an unrelated reason (such as responsive to an inactivity timer). At step 275, and in general, though hooks to cause the second OS to enter S3 will be general purpose, the means for invoking them will also take an action that allows the OSM to make a determination that the request was pursuant to an express wish to change OS context, this will typically involve placing a value in a register visible to BIOS, one way of doing just that is to invoke a BIOS service created for that express purpose. Creating and using such simple BIOS services to designate mode of various kinds are well known in the art.

At step 280, in a manner similar to the behavior at step 240, OSM takes control (typically by catching a write to PM1_CNT). Thus, OSM creates a substantially complete saved hardware context and set of wake vectors for the context of the second OS. Typically this may overwrite the context saved in step 200 as these are no longer needed.

At step 290, a hardware context for the first OS (saved as described at step 240, above) is reloaded. First OS is reactivated using saved Wake Vectors. Since the memory map seen by the first OS excludes the memory dedicated to the second OS, there is no need to reload and/or reinitialize the first OS because it is still resident in memory. This avoidance of the need to reload and reinitialize OS offers a significant improvement over many previously developed solutions.

At step 299, the process continues passing control to and fro between first and second OSes responsive to user-originated (or other, for example programmatic) requests for control transfer.

Figure 3:
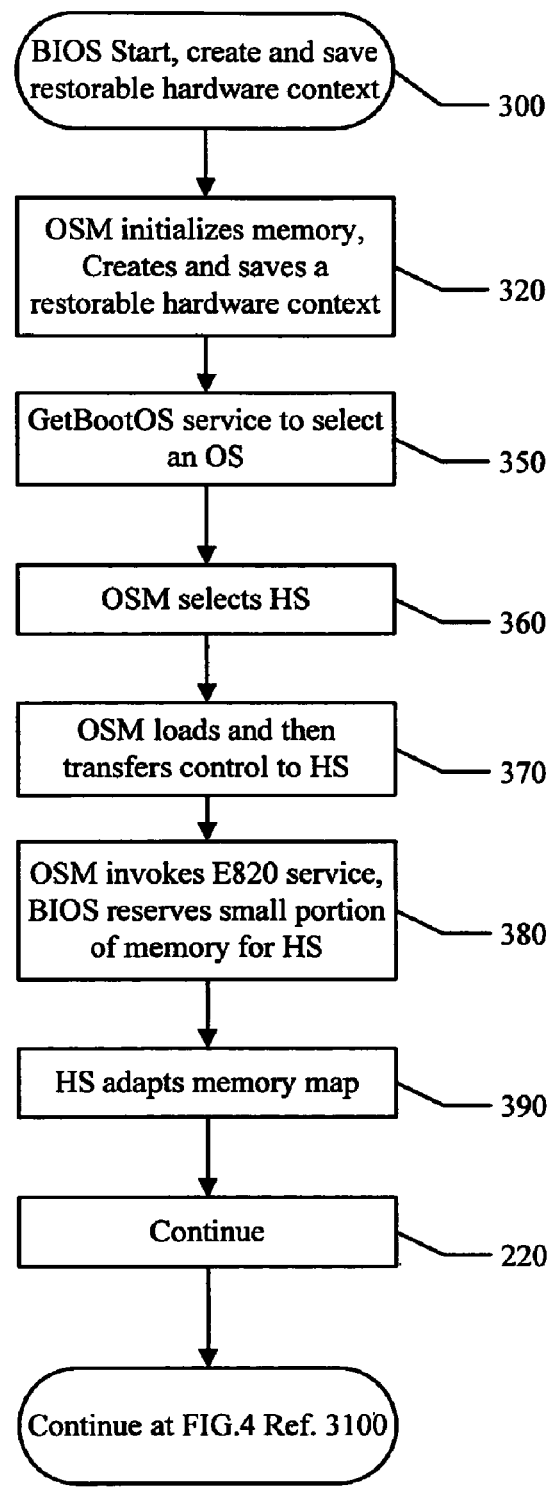
FIGS. 3 and 4, taken together are a somewhat more detailed flowchart illustrating an overview of some of the steps performed in implementing an embodiment of the invention in further detail.
Figure 4:
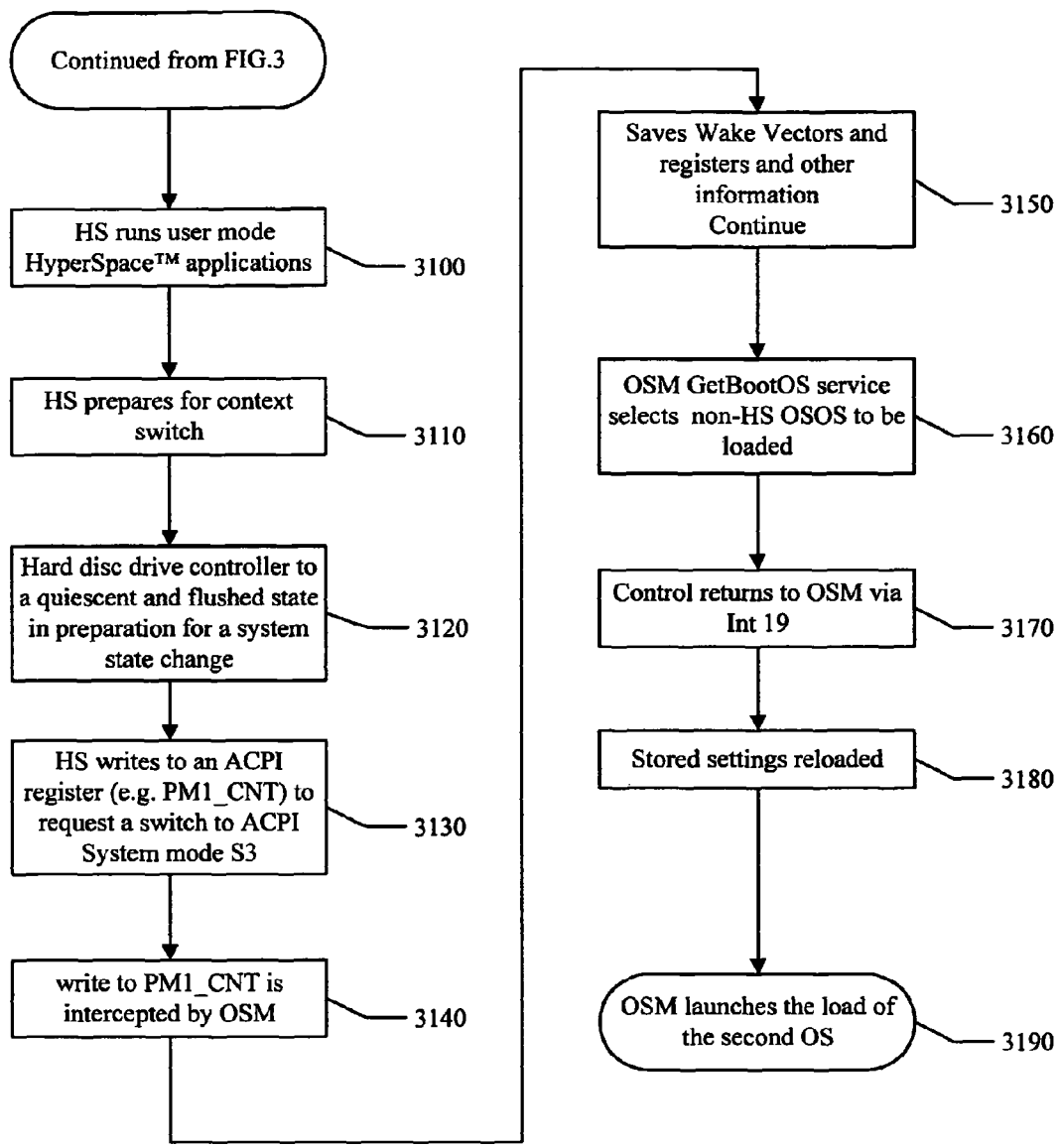

FIGS. 3 and 4, taken together are a somewhat more detailed flowchart illustrating an overview of some of the steps performed in implementing one particular embodiment of the invention in further detail. This embodiment should be regarded as purely exemplary and not as a generic description that limits the invention.

At step 300, as described in connection with FIG. 2, again execution of the pertinent part of BIOS instruction codes starts. As part of this step, BIOS defines the areas of memory that are usable by an OS and those areas that are reserved for BIOS use (for example, EBDA (extended BIOS data area), ACPI NVS (non-volatile storage) or SMRAM (System Management Mode RAM)). Alternatively some memory areas may be used by non-BIOS hardware services, for example shared video memory. BIOS then invokes OSM (OS Steering Module) by INT 19 (Interrupt 19 is well known in the art for transferring control from BIOS to bootstrap loader).

At step 320, OSM initializes memory including creating tables, saving base memory, saving ACPI NVS, PIC (programmable interrupt controller) values, hooks into E820 services to provide for custom maps and the like. Thus, inter alia, a restorable hardware context is saved.

At step 350, OSM invokes a GetBootOS service to select an OS for loading.

At step 360, OSM selects HS (HyperSpace™, a product of Phoenix Technologies Ltd. which includes application programs and an OS architecturally similar to Linux®).

At step 370, OSM loads and then transfers control to HS.

At step 380, HS discovers that OSM is loaded, and in real (or unreal) mode invokes the well-known BIOS E820 service (also described as int 15h call, AX═E820h). Knowing that the caller is HS, BIOS reserves a relatively small portion of memory for HS (256 Mebibyes in one exemplary implementation) and marks the space ARR (Address Range Reserved). In an implementation BIOS will retain that space in the ARM (Address Range Memory) whenever the first caller of the E820 service following boot or reboot is not HS.

At step 390, HS adapts its memory map to use the 256 MByte ARR (Address Range Reserved) space. HS avoids loading into ARM or creating the heap within ARM—which behavior is contrary to normal Linux® practice.

At step 3100, HS runs user mode HyperSpace™ applications.

At step 3110, Responsive to user stimulus (e.g. Hot Key depression) HS prepares for context switch.

At step 3120, the HDD (hard disc drive controller and subsystem) are brought to a quiescent and data-flushed state in preparation for a system state change.

At step 3130, HS writes to an ACPI register (e.g. PM1_CNT) which is used in previously developed OSes to request a switch to ACPI System mode S3. ACPI modes are well known in the art.

At step 3140, the write to PM1_CNT is intercepted by OSM having been hooked by OSM during initialization.

At step 3150, HS saves Wake Vectors and registers and other information such as PIC and Timer setting for later returning to the active state (S0 state in HS context). These are held separately from the PIC settings etc. stored prior to HS being loaded.

At step 3160, the OSM GetBootOS service selects the next OS to be loaded (i.e. a non-HS OS). In an embodiment of the invention, this non-HS OS is the Microsoft® Vista® OS.

At step 3170, control is returned to OSM via Int 19 (interrupt 19), which again invokes the OSM GetBootOS service to select an OS for loading.

At step 3180, the settings etc. that were stored prior to HS being loaded are reinstated.

At step 3190, OSM launches the load of the second OS (Vista® in the exemplary embodiment). The second OS is not aware of the special space reserved for HS by the E820 service routine in BIOS so it will confine itself to ARM areas and thus not overwrite HS in physical memory by being loaded into an entirely separate portion of physical system memory. This will typically not create a resource problem since the memory requires of HS are modest (typically 256 Mebibytes) as compared with a typical second OS (probably in excess of 1.5 Gebibytes or more).

This completes the loading of the two OSes and brings the system ready to switch between them responsive to user request (such as Hot Key presses) or responsive to other programmatic stimulus.

It will be apparent to a programmer of ordinary skill in the art how to extend the above procedure to provide for to and fro switching between OSes. However, distinction is to be made between a desire to leave the second OS to return to the first OS and a desire to enter the sleep state since both involve catching a hooked write to the ACPI registers. Generally this can be resolved programmatically with the OS with OSM catching whatever criterion is used to distinguish the two cases.

Figure 5:
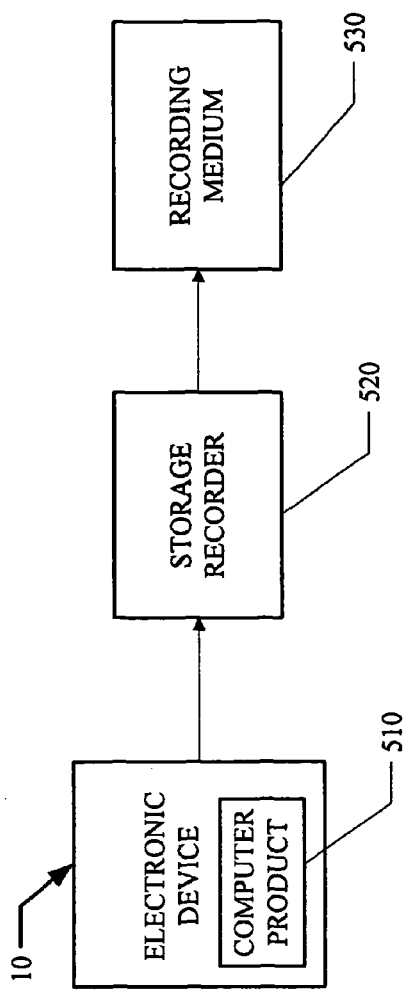
FIG. 5 shows how an exemplary embodiment of the invention may be encoded onto a computer medium or media.

With regards to FIG. 5, computer instructions to be incorporated into an electronic device 10 may be distributed as manufactured firmware and/or software computer products 510 using a variety of possible media 530 having the instructions recorded thereon such as by using a storage recorder 520. Often in products as complex as those that deploy the invention, more than one medium may be used, both in distribution and in manufacturing relevant product. Only one medium is shown in FIG. 5 for clarity but more than one medium may be used and a single computer product may be divided among a plurality of media.

Figure 6:
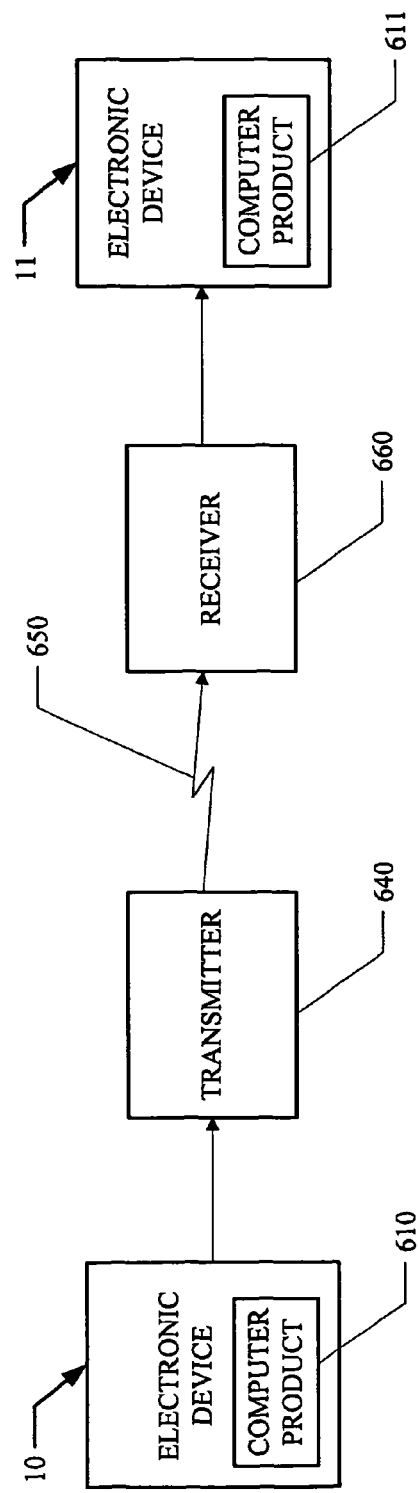
FIG. 6 shows how an exemplary embodiment of the invention may be encoded, transmitted, received and decoded using electromagnetic waves.

FIG. 6 shows how an exemplary embodiment of the invention may be encoded, transmitted, received and decoded using electromagnetic waves.

With regard to FIG. 6, additionally, and especially since the rise in Internet usage, computer products 610 may be distributed by encoding them into signals modulated as a wave. The resulting waveforms may then be transmitted by a transmitter 640, propagated as tangible modulated electromagnetic carrier waves 650 and received by a receiver 660. Upon reception they may be demodulated and the signal decoded into a further version or copy of the computer product 611 in a memory or other storage device that is part of a second electronic device 11 and typically similar in nature to electronic device 10.

Other topologies and/or devices could also be used to construct alternative embodiments of the invention. The embodiments described above are exemplary rather than limiting and the bounds of the invention should be determined from the claims. Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method of operating a computer comprising:
   loading a first OS (operating system) into a first partition of a system memory;
   loading a second OS (operating system) into a second partition of the system memory;
   in response to a request to switch from the second OS to the first OS, executing an instruction fetched from the second OS to request a change of an ACPI (Advanced Configuration and Power Interface) System State, wherein the request to change the ACPI System State comprises a write to a predefined register;
   trapping, by a module, the write to the predefined register;
   after the trapping, the module saving a hardware state for a context of the second OS; and
   after the saving, the module restoring a saved hardware state for a context of the first OS and transferring control to the first OS.

2. The method of claim 1 wherein:
   the ACPI System State is an ACPI System State S3.

3. The method of claim 1 wherein:
   the loading of the second OS is performed by the module that comprises a bootloader, and wherein the loading of the second OS is performed responsive to an ACPI request instruction sequence in the first OS.

4. The method of claim 3 further comprising:
   the module invoking a BIOS (Basic Input-Output System) service to select a next OS to be loaded by the bootloader.

5. The method of claim 1 wherein:
   the first partition is of an ARR (Address Range Reserved) type and the second partition is of an ARM (Address Range Memory) type.

6. The method of claim 1 further comprising:
   responsive to executing an instruction fetched from the first partition, restoring the saved hardware state for the context of the second OS and transferring control to the second OS.

7. The method of claim 6 further comprising:
   page swapping a portion of the second partition of system memory to a disk;
   adding the swapped portion of system memory to a software heap controlled by the first OS; and
   reinstating the swapped portion of system memory to the first partition after the executing an instruction fetched from the first partition and before the transferring control to the second OS.

8. The method of claim 1, wherein the request of the change of the ACPI System State places the second OS into a lower power state.

9. A computer program product comprising:
   at least one non-transitory computer-readable medium having instructions encoded therein, the instructions when executed by at least one processor causing said at least one processor to:
   load a first OS (operating system) into a first partition of a system memory;
   load a second OS (operating system) into a second partition of the system memory;
   in response to a request to switch from the second OS to the first OS, execute an instruction fetched from the second OS to request a change of an ACPI (Advanced Configuration and Power Interface) System State, wherein the request to change the ACPI System State comprises a write to a predefined register;
   cause a module to trap the write to the predefined register;
   after the trapping, cause the module to save a hardware state for a context of the second OS; and
   after the saving, cause the module to restore a saved hardware state for a context of the first OS and transfer control to the first OS.

10. The computer program product of claim 9 wherein:
    the first and second partitions are mutually exclusive and the loading of the second OS is performed by the module and is performed responsive to an ACPI request instruction sequence in the first OS.

11. The computer program product of claim 9 wherein:
    the loading of the second OS is performed by the module and is performed responsive to an ACPI request instruction sequence in the first OS and the module invokes a BIOS (Basic Input-Output System) service to select a next OS to be loaded.

12. The computer program product of claim 9, wherein the request of the change of the ACPI System State places the second OS into a lower power state.

13. An electronic device comprising:
    a controller; and
    a first system memory having instructions encoded therein, the instructions when executed by the controller cause said controller to:
    load a first OS (operating system) into a first partition of the first system memory or a second system memory;
    load a second OS (operating system) into a second partition of the first system memory or the second system memory;
    in response to a request to switch from the second OS to the first OS, execute an instruction fetched from the second OS to request a change of an ACPI (Advanced Configuration and Power Interface) System State, wherein the request to change the ACPI System State comprises a write to a predefined register;
    cause a module to trap the write to the predefined register;
    after the trapping, cause the module to save a hardware state for a context of the second OS; and after the saving, cause the module to restore a saved hardware state for a context of the first OS and transfer control to the first OS.

14. The electronic device of claim 13 wherein the first and second partitions are mutually exclusive.

15. The electronic device of claim 13 wherein:
the loading of the second OS is to be performed by the module and is performed responsive to an ACPI request instruction sequence in the first OS.

16. The electronic device of claim 13 wherein:
the module is an OSM (OS steering module).

17. The electronic device of claim 13, wherein the request of the change of the ACPI System State places the second OS into a lower power state.

* * * * *